United States Patent [19]
Graba

[11] Patent Number: 6,064,638
[45] Date of Patent: May 16, 2000

[54] TRACK COUNT ESTIMATOR FOR OPTICAL STORAGE DRIVES

[75] Inventor: James M. Graba, Longmont, Colo.

[73] Assignee: Cirrus Logic, Inc., Fremont, Calif.

[21] Appl. No.: 09/056,288

[22] Filed: Apr. 7, 1998

[51] Int. Cl.$^7$ ..................................................... G11B 7/085
[52] U.S. Cl. ........................................ 369/44.28; 369/54
[58] Field of Search .................................. 369/44, 28, 32, 369/54

[56] References Cited

U.S. PATENT DOCUMENTS 5,262,907  11/1993  Duffy et al. ...................... 369/44.28 X

*Primary Examiner*—Aristotelis M. Psitos
*Attorney, Agent, or Firm*—Dan Shifrin

[57] ABSTRACT

A track count estimator is provided for an optical storage device operating in either a CD-ROM mode or a DVD mode during a track seek. The track count estimator includes a state estimator to determine current and predicted estimates of the position and velocity of an optical pickup in the optical storage device according to the following equations:

Current Estimate: $\hat{X}(k|k)=\hat{X}(k|k-1)+K(Z(k)-\hat{X}_1(k|k-1))$

Predicted Estimate: $\hat{X}(k+1|k)=Ad\cdot\hat{X}(k|k)$

The input to the state estimator can be selected from a CD-ROM signal (if the optical device is operating in a CD mode) or a DVD signal (if the optical device is operating in a DVD mode), the selected signal representing a half-track position error. An error signal is then generated which is processed separately in position and velocity portions of the state estimator. The output of the position portion is a track count signal which is used by the optical storage device to determine the position of the optical pickup relative to a destination track. Track counting with the present invention provides higher resolution than conventional methods and is less prone to noise, dropouts and defects, thereby decreasing overall seek times while increasing seek accuracy.

7 Claims, 9 Drawing Sheets

TRACK COUNT ESTIMATOR FOR OPTICAL STORAGE DRIVES

FIELD OF THE INVENTION

The present invention relates to optical storage devices and, in particular, to a method and apparatus for improving the track count error rate during high speed seeks in Digital Versatile Disks and in Compact Disk, Read Only Memory devices.

BACKGROUND OF THE INVENTION

When an optical storage device such as a Digital Versatile Disk (DVD) drive or a Compact Disk Read Only Memory (CD-ROM) drive is instructed by the host computer to retrieve data from a disk, the device will in most cases need to move an optical pickup or head to a different radial position. A servo algorithm implemented in firmware is used to command radial movement to an actuator to which the head is attached. To complete the servo loop, the current radial position of the head must be known. Information is stored on an optical disk in concentric or spiral tracks and position information is found by counting track crossings with a track count block 100 as shown in the block diagram of a typical optical storage system 10 in FIG. 1 while various waveforms are illustrated in FIG. 2.

The conventional optical storage device 10 includes an optical pickup and associated circuitry 12 for receiving optical signals from a disk and generating corresponding RF signals 200, a read channel 14, a decoder 16 and an interface 18 for transmitting/receiving data and command signals to/from a host device (not shown). Additionally, the device 10 includes an envelope detector 20 coupled to receive the RF signals 200 and generate a signal T-B_ENV 202 representing the difference between the amplitude of the top of the RF signal envelope 200 and the amplitude of the bottom of the RF signal envelope 200.

If the optical device 10 reads DVD disks, a differential phase detector 22 generates a DVD_PES (position error signal) 210 from phase detection signals A, B, C and D received from the pickup 12. If the optical device 10 reads CD-ROM disks (either exclusively or in addition to reading DVD disks), a differential amplifier 24 and an analog-to-digital converter 26 generate a CD-ROM_PES 206 from phase detection signals E and F received from the pickup 12.

Exemplary waveforms of the RF signal 200, the T-B_ENV signal 202, CD-ROM_PES 206 and the DVD_PES 210 are illustrated in FIG. 2. Each of these signals is input into the track count block 100. The conventional optical storage device 10 typically employs a dual-phase track counting method and requires that the T-B_ENV signal 202 be filtered by an RF filter 101 and "sliced" by a slicer 102 relative to a threshold 204, resulting in an RF_SLICE signal 212. Additionally, the appropriate PES (depending upon the type of disk in the storage device 10) must be selected by a multiplexer (MUX) 108, filtered by a PES filter 110 and sliced by a slicer 112 relative to a threshold 205 to generate a PES_SLICE signal 214.

Count logic 104 causes a counter 106 to increment or decrement depending on the phase relationship of RF and PES slice signals 212 and 214. When the optical pickup 12 moves in one direction relative to the tracks, the PES_SLICE signal 214 leads the RF_SLICE signal 212 by 90 degrees; if the pickup 12 moves in the opposite direction, the PES_SLICE signal 214 lags the RF_SLICE 212 by 90 degrees. (Although only the phase of the PES signal 206 changes when the track crossing direction changes, because of physical imperfections in the disk, a sinusoidal component called runout may be superimposed on the seek profile. The effect will be that the observed track count appears as if it is opposite to the intended direction. For a track counting system to be accurate, changes in direction must be accurately accounted for; consequently, both the RF and PES signals must be used.)

When a seek is to be performed, servo firmware loads the counter 106 with a tracks-to-go number representing the number of tracks between the current track and the target track. The firmware also asserts a seek-in-progress signal to the counter 106 allowing the counter 106 to count down in response to a signal from the count logic module 104 and output a track count signal 216 having a resolution of ¼ track. Additional counter input signals are seek-direction and quadrature-direction which are used to change the track count direction for a given RF to PES phase relationship. The spiral-compensation signal, also an input to the counter 106, increments or decrements the track count each time an index occurs during a seek, determined by the disk's spiral direction.

The dual-phase track count method has worked well in CD-ROM applications but has numerous drawbacks when applied to DVD. Maximum seek velocities in DVD devices are much higher than typical CD-ROM seek velocities and can cause unreliable detection of the RF modulation. For example, at 500,000 tracks per second in a 1× continuous linear velocity (CLV) DVD device, the actual velocity of the media under the head can be as slow as 80% of nominal. Assuming that there are 26,175,000 bits per second and that one-fourth of the expected RF modulation period is needed to define a peak, then $$\frac{1}{4} \cdot .8 \cdot \frac{2,6175,000}{500,000} = 10.47$$

channel bits are available to define the peak. Because the average wavelength is 4.7 channel bits, an average of only one peak will be available to be peak detected by the envelope detector. Taking resolution effects into account, the peak detected signal is likely to be smaller than when the modulation is slower. Therefore, at high velocities, many of the track crossings will be missed by the RF_SLICE signal 212.

Another drawback is that DVD signals are noisy and incompatible with dual-phase. The depth of modulation in the DVD RF signal 200 is specified to be smaller than the corresponding signal in a CD-ROM device. The signal to noise ratio is thereby reduced at the input to the RF slicer 103 and the track count error rate is increased. The purpose of the filter 10 is to reject some of the noise. Because the signal of interest is a sine wave with a widely varying frequency, an optimum filter would be a tracking bandpass filter. However, conventional technology does not currently allow a practical implementation of such a filter; rather, a low pass filter is typically used but at high seek rates, the bandwidth is greater than necessary, thereby permitting low frequency noise to pass. While the bandwidth can be changed, intervention by firmware is required.

Another measure of the error rate margin is the relative spacing of the edges of the slice signals 212 and 214. The rising edge of the signal 214 should be in the center of the positive pulse of the signal 212 and every edge should be in the center of an opposing signal pulse. Thus, the duty cycle of the signal should be 50% for constant seek velocities. To meet this constraint, the slicer threshold should be halfway between the maximum excursions of the signals at the input to the slicers 102 and 112. Because the depth of modulation can vary from disk to disk, the RF slicer threshold must be calibrated for each. However, even when calibrated, the threshold will be non-ideal in certain regions of the disk and the slice signals 212 and 214 will have poor duty cycles. The problem is exacerbated by the sawtooth-wave form of the DVD_PES 210.

To compensate, a firmware Kalman filter can be used to estimate the track count and correct errors. However, a firmware Kalman filter can generally only detect large, defect-caused errors and can fail to detect small, noise-induced track slips. The filter also is heavily dependent on the track counts being received at regular intervals. If the T-B_ENV or PES thresholds are incorrect, the RF or PES slice duty cycle will not be 50% and the count steps will be irregular, necessitating a larger error detection threshold. It is especially difficult for the firmware filter to detect errors as the filter instruction rate is 88,000–176,000 instruction cycles per second while the maximum track crossing rate is greater than 500,000 tracks per second.

Moreover, current systems use no information about any previous state of the system. Consequently, errors in the track count can resemble instantaneous changes in velocity even though such changes are physically impossible.

SUMMARY OF THE INVENTION

In view of the foregoing, it is an object of the present invention to provide a method of estimating the track count of an optical storage device by applying a hardware algorithm to digitally sampled inputs.

It is another object to provide an optical storage device capable of accurately reading both CD-ROM and DVD formats.

It is another object to provide a method of counting tracks accurately at high DVD seek speeds.

It is a further object to provide a method of automatically maintaining a constant filtering bandwidth of the track crossing signal despite the signal frequency changing with seek velocity.

It is a still further object to provide a method of accurately counting tracks when the optical storage device is in a DVD mode using only the DVD signal despite changes in the seek direction due to runout.

These and other objects are achieved in the present invention with a state variable estimator acting on the sampled data from the optical pickup in an optical storage device during a track seek. The estimator has fixed coefficients which can be calculated off-line by one skilled in the art to satisfy optimal noise rejection, defect immunity, or acquisition speed. The states to be estimated are position and velocity according to the following equations:

Current Estimate: $\hat{X}(k|k)=\hat{X}(k|k-1)+K(Z(k)-\hat{X}_1(k|k-1))$

Predicted Estimate: $\hat{X}(k+1|k)=Ad\cdot\hat{X}(k|k)$

The input to the state estimator can be selected from a CD-ROM signal (if the optical device is operating in a CD mode) or a DVD signal (if the optical device is operating in a DVD mode), the selected signal representing a half-track position error. An error signal is then generated which is processed separately in position and velocity portions of the state estimator. The output of the position portion is a track count signal which is used by the optical storage device to determine the position of the optical pickup relative to a destination track.

The effective bandwidth of the bandpass filter of the estimator remains substantially constant as the effective center frequency chances. Because the bandwidth is considerably slower than the succeeding firmware resampling rate, no aliasing results. Moreover, because of the relatively small bandwidth of the estimator, the correct track count can still be determined in the presence of noise, defects, or runout induced turnarounds.

Great simplification in the estimator implementation is afforded when the estimator is linear wherein the general CD-ROM sine wave signals are converted to a ±½ track linear PES; a modulo-2 difference is used between the large valued track count and the small valued PES to generate the error signal in the estimator.

The present invention makes use of every sample and need only run at twice the track crossing rate to give accurate estimates of the track count.

The foregoing and other features and advantages of the invention will be apparent from the following more particular description of preferred embodiments of the invention, as illustrated in the accompanying drawings.

DETAILED DESCRIPTION OF THE INVENTION

Figure 1:
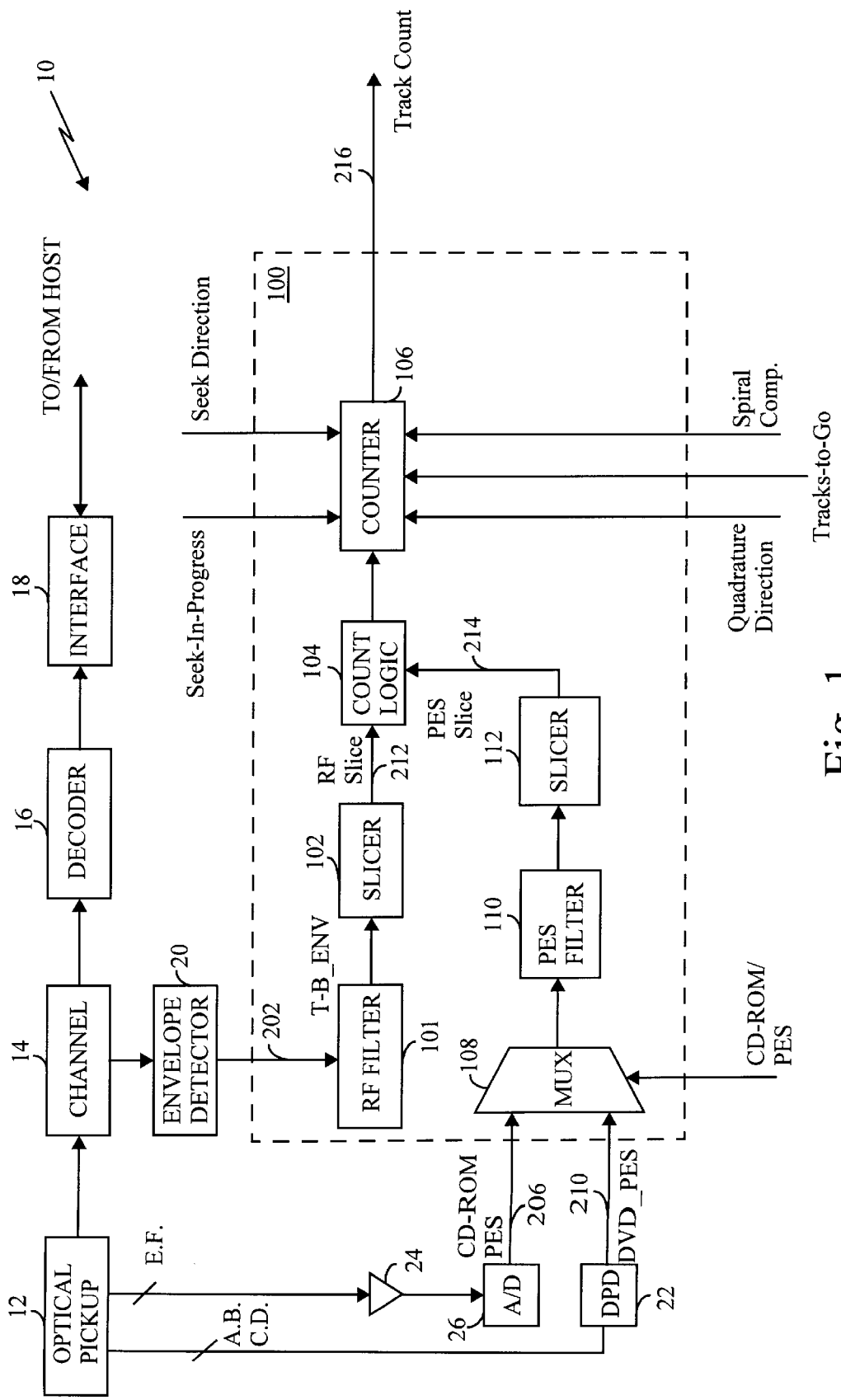
FIG. 1 is a block diagram of a conventional optical storage device with a track counting system capable of counting tracks on either a CD-ROM disk or a DVD disk.
Figure 2:
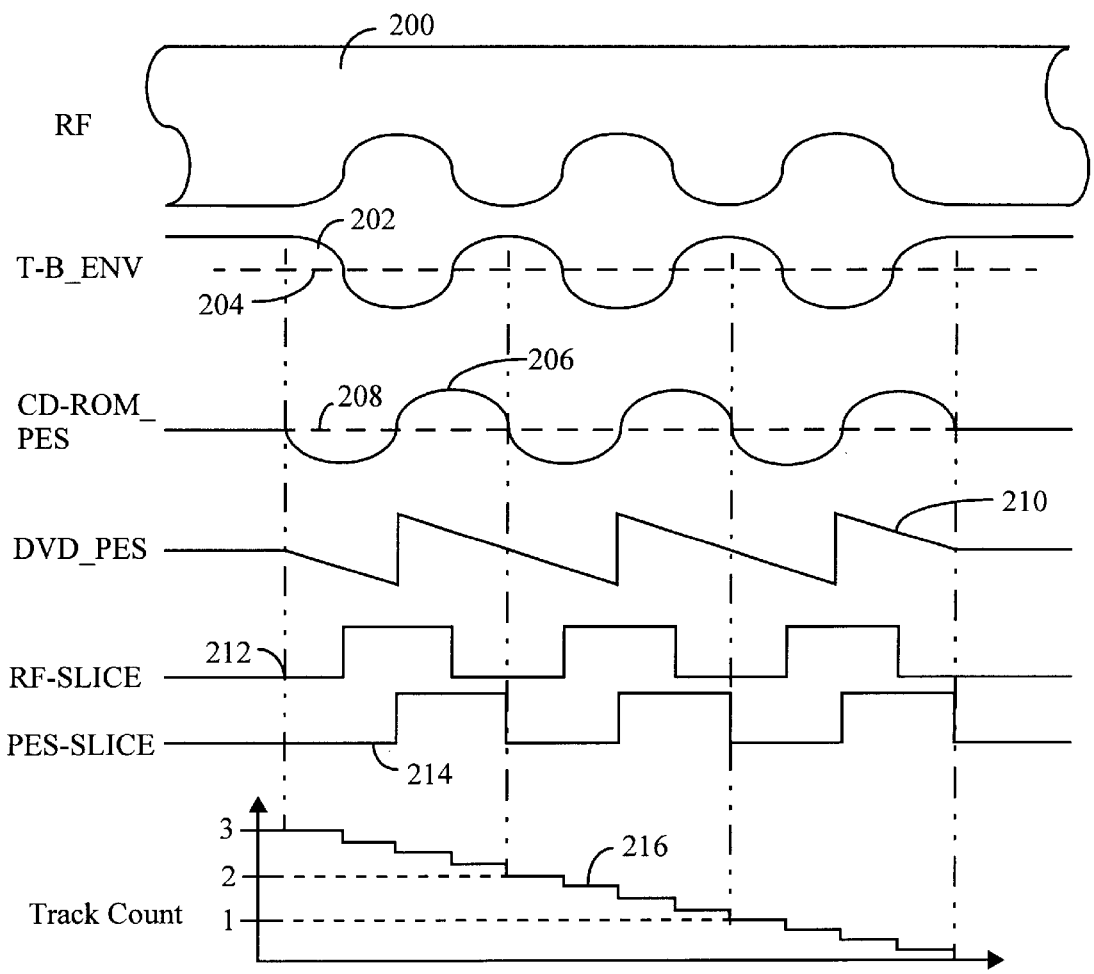
FIG. 2 illustrates exemplary waveforms of the conventional optical storage device of FIG. 1.

The present invention takes advantage of the fact that the frequency of a track crossing signal is governed by the state equation of the seek system; the same state equation is used to design the estimator 300 of the present invention. A seek system's state equation can be simplified as shown below in continuous form:

$$\frac{d}{dt}x(t) = Ad\cdot x(t) + B\cdot u(t) \quad A = \begin{bmatrix} 0 & 1 \\ 0 & 0 \end{bmatrix} \quad B = \begin{bmatrix} 0 \\ 1 \end{bmatrix}$$

$$y(t) = x_1(t) + v(t) \quad\quad x(t) = \begin{bmatrix} position(t) \\ velocity(t) \end{bmatrix}$$

where u(t) is the current (acceleration) input to the actuator coil for the optical pickup, x(t) is the state vector, y(t) is the observation, and v(t) is the observation noise. After discretizing and normalizing the sample period to 1, the state equations become:

$$X(k+1) = Ad \cdot X(k) + Bd \cdot U_k \quad Ad = \begin{bmatrix} 1 & 1 \\ 0 & 1 \end{bmatrix} \quad Bd = \begin{bmatrix} 1/2 \\ 1 \end{bmatrix}$$

$$Y(k) = X_1(k) + V(k) \qquad X(k) = \begin{bmatrix} position_k \\ velocity_k \end{bmatrix}$$

The subscript 'k' indicates the $k^{th}$ sample. Position is in units of tracks; velocity is in units of tracks/sample; and acceleration is in units of tracks/samples$^2$.

Given these state equations, the position and velocity estimates are generated by the following equations:

Current Estimate: $\hat{X}(k|k) = \hat{X}(k|k-1) + K(Z(k) - \hat{X}_1(k|k-1))$

Predicted Estimate: $\hat{X}(k+1|k) = Ad \cdot \hat{X}(k|k)$ where Z(k) represents a "half-track PES" input from either a processed DVD_PES or processed T-B_ENV and CD-ROM_PES signals. The state equations are updated during each pulse of the estimator clock.

The estimator coefficients, K, can be generated knowing the state equation, the process noise covariance (Q) and the observation noise variance (R). For example:

$$Q = \begin{bmatrix} 10^{-8} & 7 \times 10^{-10} \\ 7 \times 10^{-10} & 4.9 \times 10^{-11} \end{bmatrix}$$

$$0.18^2 < R < 0.55^2$$

$$K = dlqe\left(Ad, \begin{bmatrix} 1 & 0 \\ 0 & 1 \end{bmatrix}, [1 \; 0], Q, R\right)$$

where 'dlqe' is a Matlab function to calculate the Kalman coefficients. K can thus be calculated offline. If K is limited to powers of 2, the state equations can be efficiently implemented without impairing the performance of the estimator.

The above equations do not include any filtering of the cyclical half-track PES signal which would yield a noncyclical track count output. When the error is computed in:

$$\hat{X}(k|k) = \hat{X}(k|k-1) + K(Z(k) - \hat{X}_1(k|k-1))$$

where the error is $Z(k) - \hat{X}_1(k|k-1)$ and the track count is $\hat{X}_1(k|k)$, if the error signal is subtracted from the input in a conventional method, the absolute error would increase monotonically even if the track count is correct. However, the filtering problem is overcome in the present invention by generating the error signal using modulo-½ subtraction. When the input signal Z has a peak-to-peak amplitude equal to only one track, the half-track PES can be viewed as a wrapped version of the track count.

Figure 3:
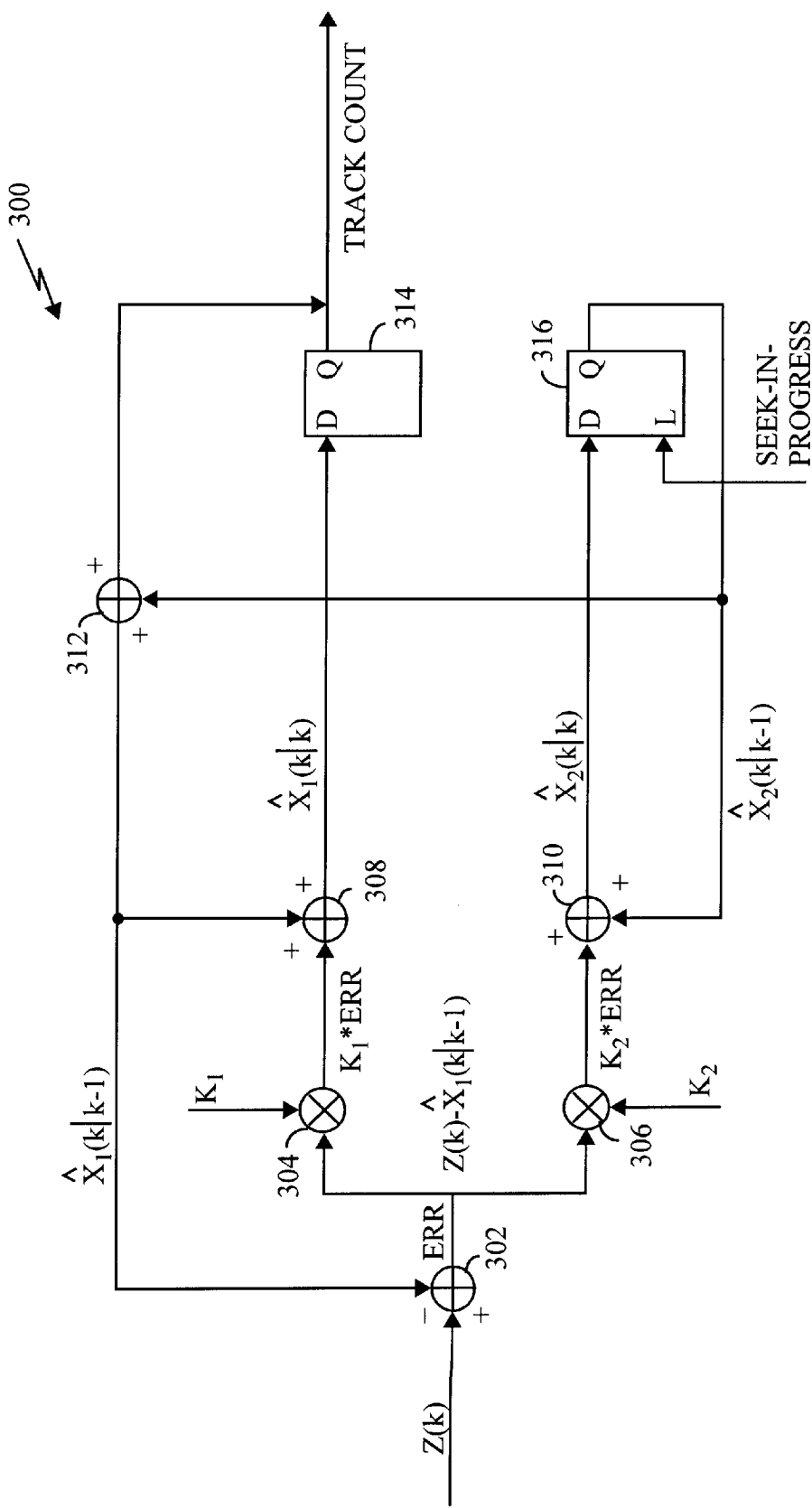
FIG. 3 is a logic diagram of one embodiment of the state estimator of the present invention.

FIG. 3 is a logic diagram of one embodiment of the state estimator 300 of the present invention in which the above state equations are implemented. The half-track PES input signal (k) is selected by a multiplexer from either a normalized DVD_PES signal (if the optical storage device is operating in a DVD mode) or a CD-ROM_PHASE signal (if the device is operating in a CD-ROM mode), as described in more detail with respect to FIG. 4. The estimator 300 includes a modulo-½ difference circuit 302, first and second multipliers 304 and 306, first, second and third adders 308, 310 and 312, and first and second delay registers or latches 314 and 316. As illustrated in FIG. 3, the input $Z_k$ output of the third adder 312 are processed by the difference circuit 302 (which wraps when it overflows past ±½ rather than saturating). The resulting error signal ERR is multiplied separately by factors $K_1$ and $K_2$ by the multipliers 304 and 306, respectively, and the results, $K_1 \cdot ERR$ and $K_2 \cdot ERR$, are sent to the first and second adders 308 and 310, respectively. The outputs of the first and second adders 308 and 310 represent the current estimates of position and velocity states $\hat{X}_1(k|k)$ and $\hat{X}_2(k|k)$, respectively.

The estimated current position and velocity state signals are latched by respective latches 314 and 316. The delayed output of the second latch 316, representing the predicted estimate of the velocity state $\hat{X}_2(k|k-1)$ is sent to the second and third adders 310 and 312; the delayed output of the first latch 314, representing the track count, is sent to the third adder 312 whose output, representing the predicted estimate of the position state $\hat{X}_1(k|k-1)$ is sent to both the first adder 308 and the mod-½ difference circuit 302. As will now be understood, the error signal ERR output from the difference circuit 302 can be represented by the state $Z(k) - \hat{X}_1(k|k-1)$.

A seek-in-progress signal enables the second latch 316 at the beginning of a seek and resets the latch 316 when the seek is completed.

Figure 4:
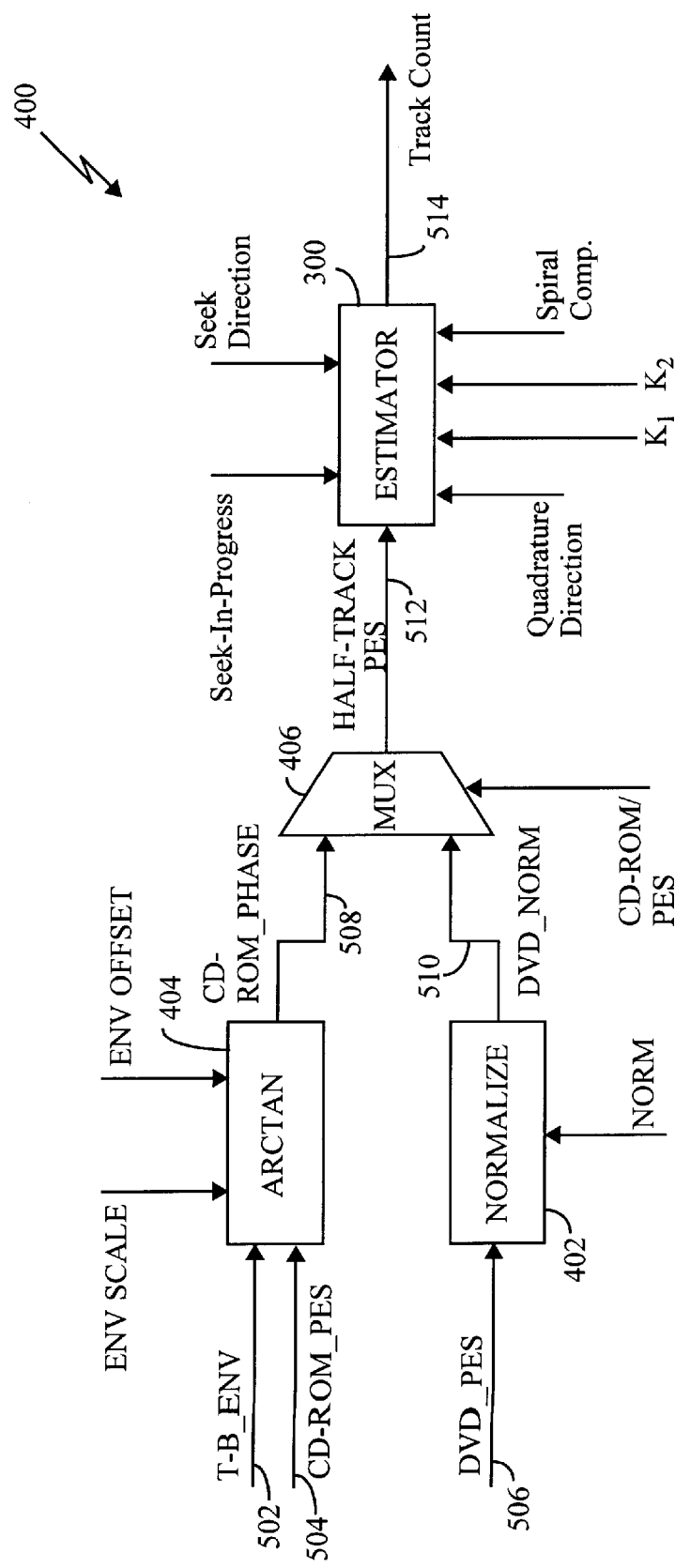
FIG. 4 is a block diagram of the track count system of the present invention in which a state estimator is employed.

FIG. 4 is a block diagram of the track count portion 400 of an optical storage system of the present invention in which the estimator 300 of FIG. 3 (or, as will be described below, the estimator 700 of FIG. 7) is incorporated. Inputs to the count logic portion 400 include a T-B_ENV signal 502 (FIG. 5) from an envelope detector, a CD-ROM_PES signal 504 processed from differential optical signals from the optical pickup when the device is in the CD-ROM mode, and a DVD_PES signal 506 processed from other differential optical signals when the device is in the DVD mode.

To account for variations in the output of the DVD_PES signal 506 due to changes in spindle speed, the DVD_PES signal 506 is divided by a programmable amount (NORM) in a normalizing block 402 such that the amplitude has a range of ±½ track, resulting in a DVD_NORM signal 510. The T-B_ENV and CD-ROM_PES signals 502 and 504 are processed by an arctan block 404 to generate a CD-ROM_PHASE signal 508. The arctan block 404 employs the following models for the T-B_ENV and CD-ROM:

T-B_ENV = A·cos(2τ·CD-ROM_PHASE)

CD-ROM_PES = B·sin(2τ·CD-ROM_PHASE)

where A is constant for each disk because of the read channel's automatic gain control and each pickup's constant optical radial power distribution. The gain of the differential amplifier through which the two differential phase signals are processed to generate the CD-ROM_PES signal 504 is calibrated such that the peak amplitude of the CD-ROM_PES 504 is within a predetermined percentage of the analog-to-digital converter range. Therefore, B is roughly constant.

Figure 5:
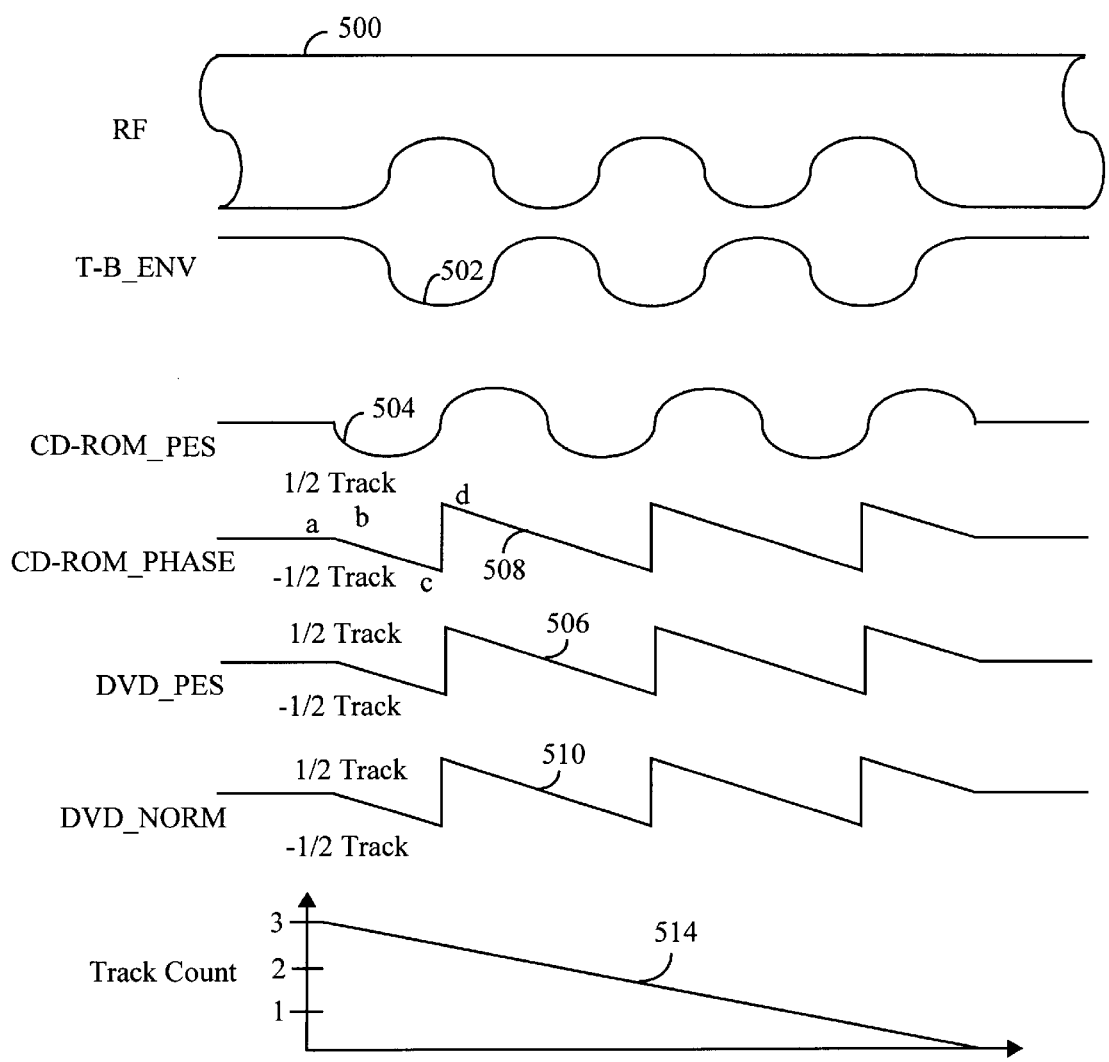
FIG. 5 illustrates exemplary CD-ROM and DVD waveforms in the track counting system of the present invention.
Figure 6:
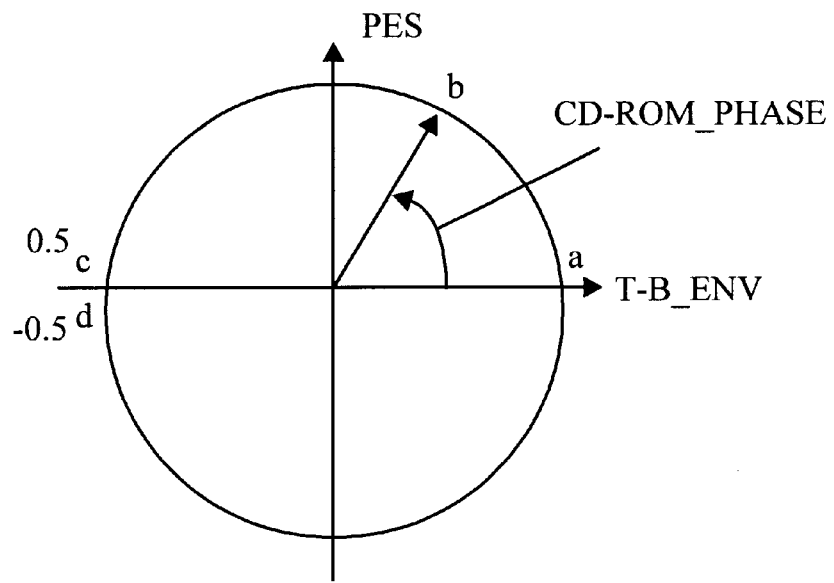
FIG. 6 illustrates the relationship between T-B_ENV and PES signals and the phase of the radial position of the optical pickup relative to a CD-ROM disk.

The arctan block 404 receives the T-B_ENV 502 and CD-ROM_PES 504 signals and offsets and scales the T-B_ENV signal 502 by programmed amounts. The CD-ROM_PES 504 needs no further adjustments because of the aforementioned calibration by the differential amplifier. The amplitudes of the two adjusted signals are input into a two dimensional lookup table having, for example, 64 entries. The phase relationships among the T-B_ENV, the CD-ROM_PES signals 502 and 504 and the resulting CD-ROM_PHASE signal 508 are illustrated in FIG. 6. ('a', 'b', 'c' and 'd' in FIGS. 5 and 6 represent selected points in time.) The output of the lookup table as the phase rotates through 360° (around the circle in FIG. 6) is a ±½ track sawtooth CD-ROM_PHASE signal 508.

Referring again to FIG. 4, a multiplexer 406 selects between the CD-ROM_PHASE signal 508 and the DVD_NORM signal 510, depending upon the current mode of operation of the optical storage device. The output of the MUX 406 is the half-track PES 512 input to the estimator of the present invention. Also input to the estimator are: a seek-in-progress signal, a seek direction signal, a spiral compensation signal, a quadrature direction signal, and multipliers $K_1$ and $K_2$. A smooth track count signal 514 is output from the estimator.

Figure 7:
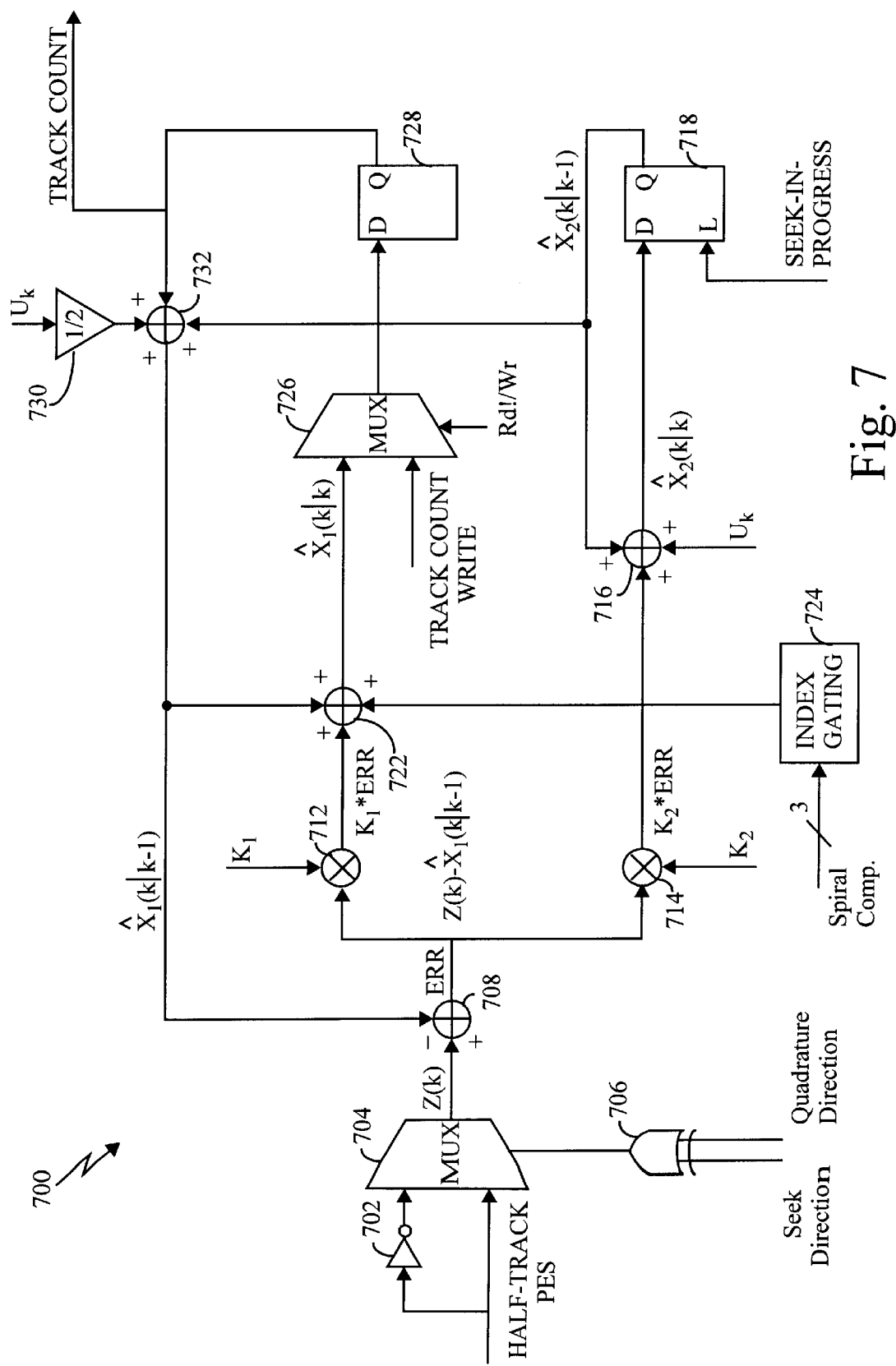
FIG. 7 is a logic diagram of another embodiment of the state estimator of the present invention.

FIG. 7 is another embodiment of an estimator 700 of the present invention which includes the inputs discussed above with respect to FIG. 4 and other circuitry not present in the embodiment of FIG. 3. Among others, the illustrated embodiment employs an acceleration command $U_k$ in the predicted state equation to improve the immunity of the estimator 700 to defects. (Because the input signals T-B_ENV, CD-ROM_PES, DVD_PES, CD-ROM_PHASE, DVD_NORM and half-track PES 502, 504, 506, 508, 510, 512 and the output track count signal 514 are substantially the same for the embodiment of FIG. 3 and the embodiment of FIG. 7, the discussion of FIG. 7 will include references to the waveforms of FIG. 5.) The half-track PES signal (selected by the MUX 406 from either the CD-ROM_PHASE signal 508 or the DVD_NORM signal 510) is inverted by an inverter 702 and both the original signal and the inverted signal serve as inputs to a multiplexer 704. Control of the MUX 704 provided by an exclusive-OR gate 706 having as its inputs seek direction and quadrature direction signals, thereby providing control over the polarity of the signal $Z_k$ depending upon the direction of the seek and the quadrature direction. The quadrature direction is the polarity of the slope of the DVD_PES signal when seeking toward the disk center and is a function of the detection diodes' connections.

The signal $Z_k$ from the MUX 704 is one input to a modulo-½ difference circuit 708. As will be described below, a second input to the mod-½ difference circuit 708 is a signal represented by the state $\hat{X}_1(k|k-1)$. The error signal ERR from the mod-½ difference circuit 708 is, therefore, equal to $Z(k)-\hat{X}_1(k|k-1)$. The ERR signal is multiplied separately by $K_1$ and $K_2$ in multipliers 712 and 714, respectively. Resulting signal $K_1 \cdot$ERR is subsequently processed in a position portion of the estimator 700 while resulting signal $K_2 \cdot$ERR is subsequently processed in a velocity portion of the estimator 700.

In the velocity portion, an adder 716 receives as one input the signal $K_2 \cdot$ERR and outputs a signal representing a current estimate $\hat{X}_1(k|k)$ of the velocity of the optical pickup. The current estimate is input into a delay register or latch 718 (which has been enabled by the seek-in-progress signal) and the delayed output is the predicted estimate $\hat{X}_1(k|k-1)$ of the velocity of the optical pickup which is added to an acceleration factor $U_k$ and to the $K_2 \cdot$ERR signal in the adder 716.

In the position portion of the estimator 700, an adder 722 receives as its inputs the signal $K_1 \cdot$ERR and an output from an index gating 724. The index gating 724 provides a method for compensating for the spiral nature of optical disks. The truth table below indicates the input requirements for the index gating 724:

| Index Enable | Spiral Direction | Index | Count Change |
|---|---|---|---|
| 0 | X | X | 0 |
| 1 | 0 | 0 | 0 |
| 1 | 0 | 1 | −1 |
| 1 | 1 | 0 | 0 |
| 1 | 1 | 1 | +1 |

Entries in the first three columns of the table represent components of the spiral compensation input signal and entries in the last column represent the output.

The output of the adder 722, representing the current estimate $\hat{X}_1(k|k)$ of the position of the optical pickup, is sent to a MUX 726, a track-count write (or tracks-to-go) signal being a second input to the MUX 726. The output of the MUX 726 is input into a second latch 728 and the delayed output, the track count signal 514, is added to the acceleration factor $U_k$ (as adjusted by an amplifier 730) in another adder 732 to which the output of the first latch 718 (representing the previous estimate of the velocity) is also added. The resulting signal represents the predicted estimate $\hat{X}_1(k|k-1)$ of the position of the optical pickup and is added to the $K_1 \cdot$ERR signal in the adder 722 as well as processed with the input signal $Z(k)$ in the mod-½ difference circuit 708.

Because the estimator is self-scaling, the clock of the estimator can be varied without changing the K values, subject to the restriction that the clock rate be at least twice the seek rate. Thus, a clock frequency of 10 MHz will satisfy the rate restriction for a seek rate of 1 million tracks per second.

Figure 8:
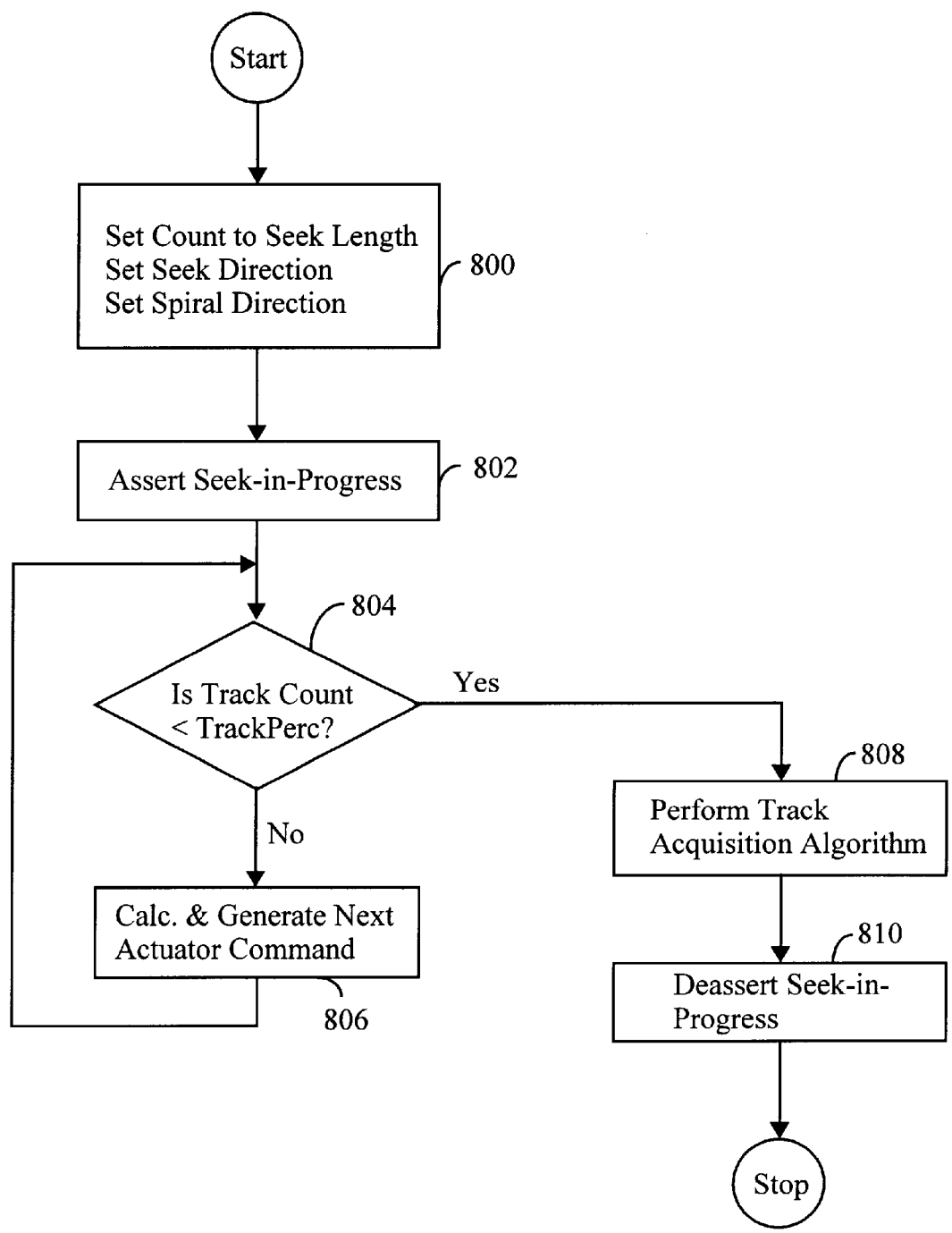
FIG. 8 is a flowchart of a seek operation employing the present invention.

The present invention requires minimal firmware intervention as shown in the flowchart of FIG. 8 of firmware actions during a seek operation. Some of the input signals, such as quadrature direction, index enable and the $K_1$ and $K_2$ coefficients, are known at drive initialization and can remain unchanged. It is preferable to set others, such as seek direction and spiral direction, immediately before the seek operation begins (step 800). Similarly, the tracks-to-go value is loaded into the position latch 728 at this time, as well. Next, in step 802, the seek-in-progress signal releases the velocity latch 718 from the reset (zero velocity) state.

In step 804, the firmware reads the track count latch 728 and compares the contents to a predetermined "track settling" threshold. For example, with the threshold set to 50%, the count must be below 0.5 tracks before the seek algorithm gives way to the settling algorithm in step 808. After settling is completed, the firmware de-asserts the seek-in-progress (step 810) to place the velocity latch 718 back in the reset state. If the track count is greater than or equal to the track settling threshold, the seek algorithm calculates the required actuator command using the current track count in step 806. It will be appreciated that one advantage of the present invention is that the resolution of the track count is not restricted to ¼, ½ or integer tracks as with state of the art track count circuits.

Figure 9:
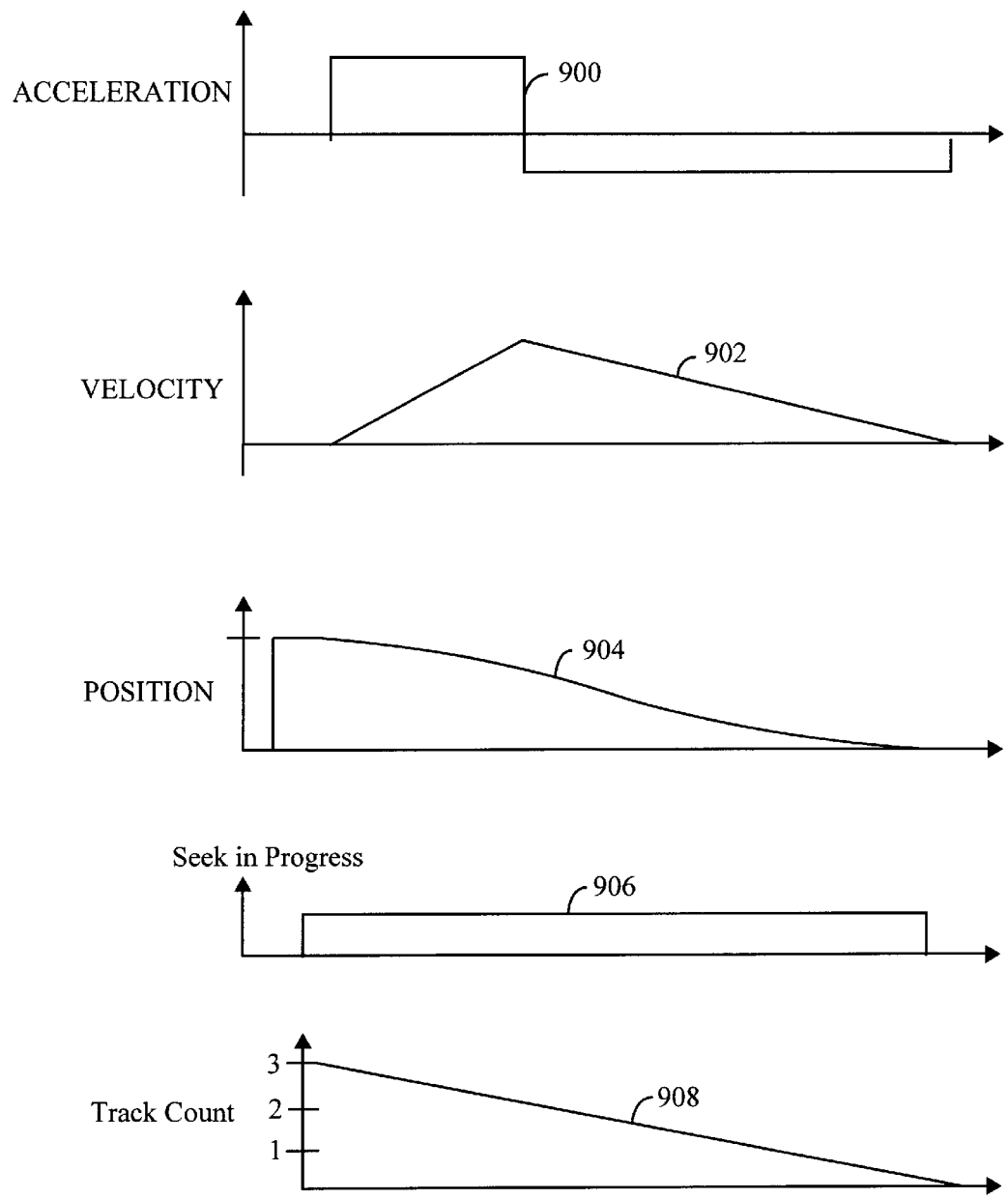
FIG. 9 illustrates a seek profile and timing diagrams of the present invention.

FIG. 9 illustrates typical seek profile plots. First, the seek length is written to the position latch 728 and is reflected in the jump in value of the position profile 904. Next the seek-in-progress 906 becomes true; the acceleration command 900 is applied and the estimator begins computing the position 904 and velocity 902 and outputs a track count 908 signal. At an appropriate point in the seek profile, the acceleration command 900 is inverted, causing the head velocity to decrease as the remaining seek length decreases (that is, as the optical pickup approaches the target track) until, when the track count is zero, the velocity 902 is zero, the acceleration command 900 is de-asserted, and the seek-in-progress 906 is de-asserted.

While the invention has been particularly shown and described with reference to preferred embodiments thereof, it will be understood by those skilled in the art that various changes in form and details may be made therein without departing from the spirit and scope of the invention as set forth in the appended claims.

What is claimed is:

1. A track count estimator for an optical storage device during a track seek operation, the optical storage device capable of operating in at least one of a CD-ROM mode and a DVD mode, the track count estimator comprising:

modulo-½ difference logic, coupled to receive an estimator input signal represented by a state $Z(k)$ and a modified track count signal represented by a state $\hat{X}_1(k|k-1)$, for generating an error signal ERR represented by a state $Z(k)-\hat{X}_1(k|k-1)$;

a first adder, coupled to receive the error signal at a first input and the modified track count signal at a second input, for generating a signal represented by a state $\hat{X}_1(k|k)$;

a first delay register, coupled to receive the signal generated by said first adder, for outputting a track count signal;

a second adder, coupled to receive the error signal at a first input and second latch signal at a second input, for generating a signal represented by a state $\hat{X}_2(k|k)$;

a second delay register, coupled to receive the signal generated by said second adder, for outputting the second latch signal represented by a state $\hat{X}_2(k|k-1)$; and a third adder, coupled to receive the track count signal at a first input and the second latch signal at a second input, for generating the modified track count signal.

2. The track count estimator of claim 1, further comprising an arctan module, coupled to receive a T-B_ENV signal and a CD-ROM_PES signal when the optical device is in the CD-ROM mode, T-B_ENV and CD-ROM_PES signals being in phase quadrature, and generating a CD-ROM_PHASE signal being the arctan of the two input signals, the CD-ROM_PHASE signal being received by said modulo-½ difference logic as the input signal with the state $Z(k)$.

3. The track count estimator of claim 2, further comprising a multiplexer coupled to receive the CD-ROM_PHASE signal at a first input and a DVD-PES signal, generated by the optical device when the optical device is in the DVD mode, at a second input, said multiplexer being responsive to the operating mode of the optical device, said multiplexer being further coupled to output a half-track PES signal to said modulo-½ difference logic as the input signal $Z(k)$.

4. The track count estimator of claim 1, further comprising:

a first multiplier, coupled between said modulo-½ difference logic and said first input of said first adder, for multiplying the error signal ERR by a first gain $K_1$, whereby said first adder receives a signal $K_1 \cdot ERR$; and a second multiplier, coupled between said modulo-½ difference logic and said first input of said second adder, for multiplying the error signal ERR by a second gain $K_2$, whereby said second adder receives a signal $K_2 \cdot ERR$.

5. The track count estimator of claim 4, wherein:

said third adder is further coupled to receive a first acceleration signal at a third input; and said second adder is further coupled to receive a second acceleration signal at a third input.

6. The track count estimator of claim 4, further comprising:

an inverter coupled to receive the estimator input signal; and a multiplexer, coupled to receive the estimator input signal at a first input and the inverted estimator input signal at a second input, said multiplexer being responsive to a direction of the seek operation.

7. A method for estimating a track count during a seek operation of an optical storage device, the optical storage device capable of operating in at least one of a CD-ROM mode and a DVD mode, the method comprising the steps of:

providing a half-track position error signal representing a state $Z(k)$;

computing the modulo-½ difference between the position error signal and a modified track count signal representing a state $\hat{X}_1(k|k-1)$, the modulo-½ difference being an error signal ERR representing a state $Z(k)-\hat{X}_1(k|k-1)$;

multiplying the error signal by a first factor $K_1$ to generate a first modified error signal $K_1 \cdot ERR$;

multiplying the error signal by a second factor $K_2$ to generate a second modified error signal $K_2 \cdot ERR$;

adding the first modified error signal $K_1 \cdot ERR$ to the modified track count signal to generate a signal representing a state $\hat{X}_1(k|k)$;

providing the signal representing a state $\hat{X}_1(k|k)$ to a first delay register, the output of the first delay register being a track count signal;

adding the second modified error signal $K_2 \cdot ERR$ to an output of a second delay register to generate a signal representing a state $\hat{X}_2(k|k)$ the output of the second delay register representing a state $\hat{X}_2(k|k-1)$; and adding the track count signal to the output of the second delay register to generate the modified track count signal representing the state $\hat{X}_1(k|k-1)$.

* * * * *